UNITED STATES PATENT OFFICE.

MATTHEW H. KOLLOCK, OF PHILADELPHIA, PENNSYLVANIA.

IMPROVEMENT IN PREPARING WHEAT FOR FOOD.

Specification forming part of Letters Patent No. 129,835, dated July 23, 1872.

Specification describing certain Improvements in Torrified Wheat, invented by MATTHEW H. KOLLOCK, of the city of Philadelphia, in the State of Pennsylvania.

My invention relates to the preparation of wheat for culinary purposes by mixing with it, after it has been roasted and when at a high degree of temperature, lactic acid, as hereinafter described.

After the wheat has been torrified or roasted I subject it to a temperature of about 220° Fahrenheit for about six hours, and thoroughly mix with it, while in a heated state, lactic acid, to add to its health-giving properties. The proportion of the acid may be varied; but I prefer about one-tenth part in weight to that of the wheat.

After the wheat has been thus prepared it had better be kept in a closed vessel to prevent any evaporation of the acid.

I claim as my invention—

The admixture of lactic acid with torrified wheat in variable proportions, substantially in the manner and for the purpose set forth.

MATTHEW H. KOLLOCK.

Witnesses:
JOS. W. HARRISON,
STEPHEN USTICK.